United States Patent [19]

Hurley et al.

[11] Patent Number: 5,244,613
[45] Date of Patent: Sep. 14, 1993

[54] PROCESS FOR THE PRODUCTION OF REINFORCED MOLDINGS AND THE RESULTANT PRODUCTS

[75] Inventors: Michael F. Hurley, Oakdale, Pa.; Terry D. Seagraves, Marion, Ind.

[73] Assignee: Miles Inc., Pittsburgh, Pa.

[21] Appl. No.: 6,560

[22] Filed: Jan. 21, 1993

[51] Int. Cl.$^5$ .............................................. C08J 9/32
[52] U.S. Cl. ...................................... 264/50; 264/51; 264/54; 264/328.1; 264/328.6; 264/328.8; 521/54; 521/99; 521/128; 521/137; 521/112
[58] Field of Search ............... 264/50, 51, 54, 328.1, 264/328.6, 328.8; 521/54, 99, 128, 137, 112

[56] References Cited

U.S. PATENT DOCUMENTS

| | | | |
|---|---|---|---|
| 4,038,238 | 7/1977 | Cravens | 260/33.6 UB |
| 4,050,896 | 9/1977 | Raffel et al. | 23/230 A |
| 4,089,206 | 5/1978 | Raffel et al. | 73/19 |
| 4,218,543 | 8/1980 | Weber et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,774,263 | 9/1988 | Weber et al. | 521/51 |
| 4,774,264 | 9/1988 | Weber et al. | 521/51 |
| 4,829,094 | 5/1989 | Melber et al. | 521/57 |
| 4,843,104 | 6/1989 | Melber et al. | 521/54 |
| 4,902,722 | 2/1990 | Melber | 521/54 |
| 4,959,395 | 9/1990 | Janda | 521/54 |

FOREIGN PATENT DOCUMENTS 60-244511 12/1985 Japan .

Primary Examiner—Morton Foelak
Attorney, Agent, or Firm—Joseph C. Gil

[57] ABSTRACT

It has been found that the use of specific expanded organic microspheres greatly improve the RIM process by (i) significantly enhancing the blowing action of air and/or nitrogen, (ii) providing for uniform density of the molded part, (iii) allowing for the reduction of internal mold pressures, (iv) substantially eliminating surface defects, (v) allowing for a significant reduction in density in the molded product, (vi) allowing for a substantial increase in the amount of air and/or nitrogen that can be dissolved in the isocyanate-reactive component, and (vii) significantly reducing shrinkage in the molded part.

7 Claims, No Drawings

PROCESS FOR THE PRODUCTION OF REINFORCED MOLDINGS AND THE RESULTANT PRODUCTS

BACKGROUND OF THE INVENTION

A variety of different molded parts can be produced by reaction injection molding ("RIM") process. This process involves filling a closed mold with highly reactive, liquid starting components within a very short time, generally by using high out-put, high pressure dosing apparatus after the components have been mixed. The RIM process has become an important process for the production of external automotive body parts and other types of molded products. The RIM process involves the intimate mixing of a polyisocyanate component and an isocyanate-reactive component followed by the injection of this mixture into a mold for subsequent rapid curing. The polyisocyanate component is typically based on a liquid polyisocyanate. The isocyanate-reactive component contains a high molecular weight isocyanate-reactive component, typically a polyol and/or an amine polyether, and usually contains a chain extender containing amino and/or hydroxyl groups. U.S. Pat. No. 4,218,543 describes a RIM process currently being commercially used on a large scale. U.S. Pat. Nos. 4,433,067, 4,444,910, 4,530,941, 4,774,263, and 4,774,264 describe reaction injection molding processes for the production of polyurethane(urea) elastomers.

In spite of the many advantages of the RIM process, there is a continual search for faster reactive systems, particularly for use in mass production industries, such as the automotive industry. However, such active systems would gel so quickly upon mixing of the components that the final products produced would have relatively high densities (i.e., 1.12 grams per cubic centimeter) since conventional organic blowing agents do not volatilize quickly enough to have any blowing effect. One suggestion, which has met with some success, has been to include in one or more of the components air and/or nitrogen under pressure. The use of air and/or nitrogen in polyurethane systems is, of course, known, as are the many and varied techniques for providing such dissolved air and/or nitrogen. For example, air and/or nitrogen has been introduced directly into the mixing chamber and mixed simultaneously with the reactive mixture. Additionally, the air and/or nitrogen has been whipped into one or more of the components. The creamy mixture formed is then metered by means of a pump to a final mixing chamber where it is mixed with the other reactive components. When the metering pump discharges at a sufficiently high pressure, the quantity of gas which is initially dissolved and/or dispersed in the starting material, which is fed to the metering pump, dissolves at the higher pressure in a very short period of time. The liquid fed to the mixhead then contains gas in the dissolved state. Upon being fed to the mixhead, dissolution takes place in a very short time. In general, it is preferred that the gas be dissolved in one or more of the components. Other techniques for dissolving gases are also known and are described in U.S. Pat. Nos. 4,089,206 and 4,050,896.

Although the use of such dissolved air and/or nitrogen has met with some success with highly active systems, it has been found that the resultant molded part, while of reduced density (e.g., from 0.99 to 1.09 grams per cubic centimeter), will have varied densities throughout the molded part. As noted above, air and/or nitrogen is effectively dissolved under pressure in one or more of the components. It has been observed that when this pressure is relieved (e.g., upon passage of the components through the mixhead and into the mold), the air and/or nitrogen does not immediately pass from the dissolved state to the dispersed state. It is believed that a state of super saturation exists in liquid reacting system containing the dissolved gas for some finite period of time. For highly reactive systems, this delay in passage from the dissolved to the dispersed state is sufficiently long so that gelation occurs in the mold before proper blowing.

Expanded microspheres consisting of a synthetic thermoplastic resin shell that encapsulates a liquid blowing agent are known. See, e.g., U.S. Pat. Nos. 4,829,094, 4,843,104, and 4,902,722. Such microspheres have been suggested for use in plastics, coatings and adhesives, and are described as having the ability to reduce density, to lower volume costs, to improve impact resistance, and to reduce shrinkage (see "Dualite" product information bulletin). In addition, such microspheres have been described as useful in low density rapid setting polyurethanes (see U. S. Pat. No. 4,038,238) and in non-polyurethane-based reaction injection molded polymers (see, e.g., U.S. Pat. No. 4,959,395). Finally unexpanded microspheres have been described for use in polyurethane RIM (see Japanese Patent Publication 60-244511).

DESCRIPTION OF THE INVENTION

The instant invention is directed to an improved reaction injection molding process comprising mixing an organic polyisocyanate with an isocyanate reactive component, introducing the resultant reaction mixture into a closed mold, allowing the components to react, and removing the product from the mold. The improvement resides in using an isocyanate reactive component comprising:

a) one or more compounds containing at least two isocyanate reactive groups, b) air and/or nitrogen dissolved in said component a) in an amount sufficient to produce a molded product having a density of at least 0.75 gms/cm$^3$, c) up to 4.0% by weight, and preferably from 0.1 to 1.0% by weight, based upon the amount of component a) of a polyether siloxane surfactant, d) up to 45% by weight, and preferably from 5 to 45% by weight (most preferably from 15 to 40% by weight) based upon the weight of the molded product of an inorganic reinforcing filler for reducing expansion of the molded product during application of heat and for reducing contraction of the molded product upon cooling, and e) expanded microspheres comprised of a synthetic thermoplastic resin shell that encapsulates a liquid blowing agent, said microspheres being present in an amount sufficient to form a mixture with components a), b), c), d) and e) having a density of at least 10% less than the density of the same mixture without said microspheres.

It has been found that the use of the above-noted microspheres (i) significantly enhance the blowing action of the air and/or nitrogen, (ii) provide for uniform density of the molded part, (iii) allow for the reduction of internal mold Pressures, (iv) substantially eliminate surface defects, (v) allows for a significant reduction in density in the molded product, and (vi) significantly reduces shrinkage in the molded part. In addition, and most importantly, the addition of the microspheres allows for a substantial increase in the amount of air and/or nitrogen that can be dissolved in the isocyanate-reactive component.

The expanded microspheres useful herein are known and are described in U.S. Pat. Nos. 4,829,094, 4,843,104, 4,902,722 and 4,959,395, the disclosures of which are herein incorporated by reference. Commercially available microspheres include Dualite M6017AE, Dualite M6001AE, and Dualite M6029AE, all available from Pierce & Stevens Corporation, and Expandocel available from Nobel Industries. These commercially available microspheres are expanded, hollow microspheres consisting of a thin shell of a vinylidene chloride, polypropylene or acrylonitrile copolymer. The interior of the Dualite and Expandocel microspheres contains a volatile hydrocarbon (which is pentane in the case of Dualite microspheres and isobutane in the case of Expandocel microspheres). This is used to expand the microsphere and remains inside the shell thereafter. There is also present on the Dualite microspheres a rough coating of calcium carbonate dust on the outside of the microsphere.

It is typical of available microspheres that a given sample contains a range of sizes. The microspheres used in this invention are hollow microspheres with a mean diameter of between 50 and 90 microns, preferably 90 microns. The microspheres actually cover a range of diameters from about 10 to 150 microns. The preferred range of diameters being 45 to 135 microns. The density of these hollow microspheres ranges from 0.02 to 0.13 $g/cm^3$.

The amount of microspheres added is such that the mixture of the isocyanate-reactive components (component a)), the air/nitrogen (componet b)), the siloxane (component c)), the reinforcing filler (component d)), and the microspheres (component e)) has a density at least 10% less than the same mixture without the microspheres. In fact, density reductions in the range of from 10 to 30% are readily attained. In general, the amount of microspheres added can vary over a wide range and is typically from 0.1 to 7.0% by weight based upon the weight of the isocyanate-reactive components (component a)), and preferably from 2.5 to 6.0% by weight.

Suitable polyisocyanates for use in the present invention include aliphatic, cycloaliphatic, araliphatic, aromatic and heterocyclic polyisocyanates which are known and described, for example, by W. Siefken in Justus Liebigs Annalen der Chemie, 562, pages 75-136. Specific examples include ethylene diisocyanate; 1,4-tetramethylene diisocyanate; 1,6-hexamethylene diisocyanate; 1,12-dodecane diisocyanate; cyclobutane- 1,3-diisocyanate; cyclohexane-1,3- and -1,4-diisocyanate and mixtures thereof; 1-isocyanato-3,3,5-trimethyl -5-isocyanatomethyl-cyclohexane (isophorone diisocyanate or IPDI); 2,4- and 2,6-hexahydrotoluylene diisocyanate and mixtures thereof; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-toluene diisocyanate and mixtures thereof; diphenylmethane 2,4'- and/or 4,4'-diisocyanate; naphthylene 1,5-diisocyanate; triphenyl methane-4,4', 4''-triisocyanate; and polyphenyl polymethylene polyisocyanates of the type obtained by condensing aniline with formaldehyde, followed by condensation.

It is preferred to use the readily available polyisocyanates such as 2,4- and 2,6-toluene diisocyanate and mixtures of such isomers; polyphenyl polymethylene polyisocyanates of the type obtained by condensing aniline with formaldehyde, followed by phosgenation; and polyisocyanates containing carbodiimide groups, urethane groups, allophanate groups, isocyanurate groups, urea groups or biuret groups. Particularly preferred are the liquid derivatives of 4,4'-diphenyl methane diisocyanate (MDI) which may be liquefied by introducing carbodiimide groups, blending with 2,4'-diphenyl methane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as the polyisocyanate component are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Other suitable reactants for preparing the products of the present invention include compounds containing at least two isocyanate-reactive groups. These compounds may be divided into two groups, high molecular weight compounds having molecular weights of from 400 to about 10,000 and low molecular weight compounds, i.e. chain extenders, having molecular weights of from 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32-42 and 44-54, and Volume 11, 1964, pages 5-6 and 198-199; and in Kunststoff-Handbuch, Vol. VII, Vieweg-Hochtlen, Carl Hanser Verlag, Munich, 1966, pages 45-71.

Suitable aminopolyethers which may be used in accordance with the present invention as high molecular weight compounds (the molecular weight is always the average molecular weight which may be calculated from the functionality and the content of isocyanate-reactive groups) are those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and French Patent 1,551,605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428 and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of NCO prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with German Offenlegungsschrift 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds are used in admixture with up to about 95% by weight, preferably up to about 50% by weight, more preferably about 8 to 30% by weight and most preferably about 12 to 26% by weight, based on the total quantity of the high molecular weight compounds, of the low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5- diethyl-2,4-diamino benzene, 1-methyl-3,5-diethyl-2,6-diaminobenzene, 1,3,5-trimethyl-2,4-diaminobenzene, 1,3,5-triethyl-2,4-diaminobenzene, 3,5,3',5'-tetraethyl-4,4'-diamino diphenylmethane, 3,5,3',5'-tetraisopropyl-4,4'-diamino diphenylmethane, 3,5-diethyl- 3',5'-diisopropyl-4,4'-diaminodiphenylmethane, 3,5-diethyl-5,5'-diisopropyl-4,4'-diaminodiphenylmethane, 1-methyl-2,6-diamino-3-isopropylbenzene and mixtures of the above diamines. Most preferred are mixtures of 1-methyl-3,5-diethyl-2,4- diaminobenzene and 1-methyl-3,5-diethyl-2,6-diaminobenzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'-and/or 4,4'-diaminodiphenylmethane, 1,2- and 1,4-phenylene diamine, naphthalene-1,5-diamine and triphenylmethane-4,4',4"-triamine. The difunctional and polyfunctional aromatic amine compounds may also exclusively or partly contain secondary amino groups such as 4,4'-di-(methyl-amino)-diphenylmethane or 1-methyl-2-methylamino-4-aminobenzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

Although not required, it is preferred that the reaction mixture also include a polyether siloxane. Such polyether siloxanes are of the type generally known and used in the polyurethane art. Suitable materials include water-soluble polyether siloxanes. The structure of these compounds is generally such that a copolymer of ethylene oxide and propylene oxide is attached to a polydimethyl siloxane radical. The presently preferred siloxane is Tegostab B-8418, available from Goldschmidt. This material is described as being the reaction product of a polysiloxane and an allyl alcohol-started polyether polyol. Methods of manufacturing the preferred siloxanes are described in U.S. Pat. No. 4,906,721, the disclosure of which is herein incorporated by reference.

Inorganic reinforcing fillers for the reduction of expansion of the molded product during application of heat and for reduction of contraction of the molded product upon cooling are well known in the art. Such fillers include glass in the form of fibers, flakes or microspheres; mica; wollastonite; carbon black; talc; calcium carbonate; and carbon fibers.

Air and/or nitrogen is also necessary and is introduced into one or more of the components using techniques known in the art. It is presently preferred to use commercial techniques such as Diffuser Stone-KIMEX mixers and venturi type mixers. The presently preferred device is a Hennecke Aeromat-GU which is described in Hennecke Trade Bulletin #41 and in a 1991 article entitled "Consistent Distribution of Finely Dispersed Gases in Polyol Streams", Proksa et al, in Polyurethanes World Congress 1991.

Enough gas is customarily put into the system in an amount in excess of the amount necessary to saturate the particular component at a feed tank pressure of from about 0.21 to about 0.35 N/mm$^2$. As is known in the art, material flows from the feed tank through a transfer pump (which increases the pressure of the particular component) through a metering pump to the mixhead. Discharge pressures of the transfer pump are generally in the range of 0.35 to 0.7 N/mm$^2$, while discharge pressures of the metering pump are generally in the range of 14 to 21 N/mm$^2$. The amount of the gas in the system is generally monitored using commercial measuring equipment which responds to changes in specific gravity of the liquid components. One such device is the Dynatrol (Mfg. by Automation Products). This device permits the effective control of the gas content by monitoring any changes in the specific gravity of the liquid component.

Other additives which may be used in the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diaza-bicyclo-(2,2,2)-octane (triethylene diamine), especially mixtures of these catalysts. The catalysts are generally used in amounts of about 0.01 to 10%, preferably about 0.05 to 2%, based on the weight of the high molecular weight component.

It is also possible to use surface-active additives such as emulsifiers and foam stabilizers. Examples include N-stearly-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

In addition to the catalysts and surface-active agents, other additives which may be used in the molding compositions of the present invention include known blowing agents, cell regulators, flame retarding agents, plasticizers, dyes, fillers and mold release agents of the type generally known in the art. Useful mold release agents can be found in U.S. Pat. Nos. 4,519,965, 4,581,386, 4,876,019, and 5,135,962.

The compositions according to the present invention are especially suited for processing by the RIM process. In general, two separate streams are intimately mixed and subsequently injected into a suitable mold, although it is possible to use more than two streams. The first stream contains the polyisocyanate component, while the second stream contains the isocyanate-reactive component, chain extender, any internal mold release agent, and any other additive which is to be included.

The quantity of polyisocyanate used in the process according to the present invention is preferably calculated so that the foamable mixture has an isocyanate index of from 70 to 130, in particular from 90 to 110. By "isocyanate index" is meant the quotient of the number of isocyanate groups and number of groups which are reactive with isocyanates multiplied by 100.

The known RIM process is used for carrying out the process according to the present invention. In general, the components may be mixed simultaneously, or the non-reactive components may be pre-mixed and then mixed with the reactive components.

A starting temperature of from 10° to 70° C., preferably from 30° to 50° C., is chosen for the mixture introduced into the mold. The temperature of the mold itself is generally from 40° to 100° C., and preferably from 50° to 70° C.

The moldings obtainable by the process according to the present invention are particularly suitable for the manufacture of flexible car bumpers and car body elements. However, with suitable variation of the starting components and particularly if a relatively low proportion of the active diamine is used, it is also possible to produce materials which have good abrasion resistance and high mechanical strength e.g. flexible polyurethane shoe soles.

The invention is further illustrated, but is not intended to be limited by the following examples in which all parts and percentages are by weight unless otherwise specified.

EXAMPLES

Example 1

A B-side was prepared using 72 parts of a 4800 molecular weight trifunctional polyether polyol (glycerin starter, with a PO:EO weight ratio of about 5:1), 10 parts of diethyltoluene diamine ("DETDA"), 10 parts of ethylene glycol, 7 parts of a zinc stearate concentrate consisting of 4 parts of a 400 molecular weight diamine (Jeffamine D-400, available from Texaco), 2 parts of zinc stearate, and 1 part of a 356 molecular weight tetrafunctional polyol (prepared from ethylene diamine and propylene oxide). Also added to the blend was 0.01 parts of Dabco 33-LV (a triethylene diamine commercially available from Air Products), 0.05 parts of Hexcham 977 (a solution of potassium 2-ethylhexonate in hydrocarbon solvent, commercially available from Mooney Chemicals), 0.1 parts of Witco UL-22 (a dimethyltin dimercaptide, commercially available from Witco), and 0.5 parts of Goldschmidt B-8418 (a polysiloxane surfactant).

A polyol slurry was prepared as would normally be used in the molding of a urethane RRIM product. To the above polyol blend was added a charge of Wollastonite filler (NYCO Nyad 325) and the charge of Dualite M6017AE microspheres. The weight ratio of polyol blend to Wollastonite filler to microsphere was 100 to 84 to 5.3, respectively.

The polyol slurry was charged to the polyol run tank of a Cincinnati Milacron CM-90. The slurry was nucleated via a hollow shaft high rpm nucleator based on the use of cavitation to introduce nitrogen. Without the use of the microspheres a density level of 0.80 to 0.84 g/cm$^3$ was attained. The slurry containing the microspheres was able to attain 0.66 to 0.70 g/cm$^3$.

This slurry was combined with Mondur MR (a commercially available polymethylene poly(phenyl isocyanate, having an NCO content of about 30% by weight, and consisting of 55% by weight of diisocyanate and 45% by weight of polyisocyanate isocyanate) at a ratio of 40 parts of isocyanate to 100 parts of slurry. Urethane parts were molded on a Cincinnati Milacron CM-90 RMIM machine. The mold was a steel mold (P-2 steel) having the dimensions 4.5 mm×64 cm×92 cm. The mold temperature was 68° C. The chemical temperatures were maintained at 43° to 46° C. for the isocyanate and 52° to 57° C. for the polyol slurry. The mixing pressures were 11.2 N/mm$^2$ for each component. Urethane plaques of excellent quality and physical properties were produced.

Example 2

Example 1 was repeated using another polyol blend. A B-side was prepared mixing 78 parts of a 6000 molecular weight trifunctional polyether polyol (glycerin starter with a PO:EO weight ratio of about 5:1), 15.7 parts of DETDA, 7 parts of the same zinc stearate concentrate as in Example 1, 0.1 parts of Dabco 33-LV, 0.05 parts of Witco UL-28, 0.05 parts of dibutyl tin dilaurate, and 0.5 parts of Goldschmidt B-8418. The slurry was prepared using the Wollastonite filler Wollastokup G and Dualite M6017AE microspheres. To 100 parts of this polyol was added 30 parts of Wollastonite filler and 3.4 parts of the microspheres. Nucleation was carried out in the same manner as above to yield a slurry density of 0.48 to 0.53 g/cm$_3$. The same mixture could only be nucleated to a level of 0.64 g/cm$_3$ when the microspheres were not present.

This slurry was allowed to react with an isocyanate prepared by reacting 4,4'-methylenebis(phenyl isocyanate) with tripropylene glycol (NCO content was about 22.5%) at a ratio of 38 parts of isocyanate to 100 parts of slurry under conditions outlined in Example 1 to give molded automotive fascia of excellent physical properties.

Example 3

Example 1 was repeated using another polyol blend. A B-side was prepared mixing 74 parts of a 4800 molecular weight trifunctional polyether polyol (glycerin starter with a PO:EO weight ratio of about 5:1), 10 parts of DETDA, 5 parts of ethylene glycol, 7 parts of the same zinc stearate concentrate as in Example 1, 0.1 parts of Dabco 33-LV, 0.1 parts of Witco UL-22, and 0.5 parts of Goldschmidt B-8418. Again slurries were prepared using a Wollastonite filler Wollastokup G and Dualite M6017AE microspheres. To 100 parts of this polyol was added 30 parts of Wollastonite filler and 3.4 parts of the microspheres. To a second 100 parts of the slurry, 30 parts of Wollastonite filler was added. Nucleation was carried out in the same manner as above to yield a slurry density of 0.48 to 0.53 g/cm$_3$ for the slurry containing the hollow microspheres. The same mixture could only be nucleated to a level of 0.64 g/cm$_3$ when the microspheres were not present.

Again this slurry was reacted with the isocyanate used in Example 1 at a ratio of 38 parts of isocyanate to 100 parts of the slurry under conditions identical to Example 1. This produced plaques of urethane of excellent quality and properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a reaction injection molding process comprising mixing an organic polyisocyanate with an isocyanate reactive component, introducing the resultant reaction mixture into a closed mold, allowing the components to react, and removing the product from the mold, the improvement wherein said isocyanate reactive component comprises:
   a) one or more compounds containing at least two isocyanate reactive groups,
   b) air and/or nitrogen dissolved in said component a) in an amount sufficient to produce a molded product having a density of at least 0.75 grams/cm$^3$,
   c) up to 4.0% by weight based upon the amount of component a) of a polyether siloxane surfactant,
   d) up to 45% by weight based upon the weight of the molded product of an inorganic reinforcing filler for reducing expansion of the molded product during application of heat and for reducing contraction of the molded product upon cooling, and
   e) expanded microspheres comprised of a synthetic thermoplastic resin shell that encapsulates a liquid blowing agent, said microspheres being present in an amount such that the mixture of components a), b), c), d), and e) has a density at least 10% less than the same mixture without the microspheres.

2. The process of claim 1, wherein component c) is used in an amount of from 0.1 to 1.0% by weight, based upon the weight of component a).

3. The process of claim 1, wherein component d) is used in an amount of from 5 to 45% by weight, based upon the weight of the molded product.

4. The process of claim 1, wherein said microspheres are present in an amount of from 0.1 to 7.0% by weight based upon the amount of component a).

5. The process of claim 4, wherein said expanded microspheres are present in an amount of from 2.5 to 3.0% by weight based upon the amount of component a).

6. The process of claim 1, wherein said said reinforcing filler is used in an amount of from 15 to 40% by weight based upon the weight of the molded product.

7. The process of claim 6, wherein said reinforcing filler is selected from the group consisting of glass, mica, wollastonite, carbon black, talc, calcium carbonate and carbon fibers.

* * * * *